(12) United States Patent
Yu

(10) Patent No.: US 12,174,417 B2
(45) Date of Patent: Dec. 24, 2024

(54) CHECKERBOARD IMAGER AND IMPLEMENTATION METHOD THEREFOR

(71) Applicant: Shanghai Institute of Technical Physics, Chinese Academy of Sciences, Shanghai (CN)

(72) Inventor: Qinghua Yu, Shanghai (CN)

(73) Assignee: Shanghai Institute of Technical Physics, Chinese Academy of Sciences, Shanghai (CN)

( * ) Notice: Subject to any disclaimer, the term of this patent is extended or adjusted under 35 U.S.C. 154(b) by 184 days.

(21) Appl. No.: 18/164,532

(22) Filed: Feb. 3, 2023

(65) Prior Publication Data

US 2023/0185021 A1    Jun. 15, 2023

Related U.S. Application Data

(63) Continuation of application No. PCT/CN2020/115763, filed on Sep. 17, 2020.

(30) Foreign Application Priority Data

Sep. 15, 2020 (CN) .......................... 202010965700.X

(51) Int. Cl.
*G02B 6/12* (2006.01)
*G02B 6/42* (2006.01)
*G02B 27/00* (2006.01)

(52) U.S. Cl.
CPC ..... *G02B 6/12019* (2013.01); *G02B 6/12002* (2013.01); *G02B 6/12014* (2013.01); *G02B 6/4219* (2013.01); *G02B 27/0012* (2013.01)

(58) Field of Classification Search
CPC ............ G02B 6/12019; G02B 6/12002; G02B 6/12014; G02B 6/4219; G02B 6/12009;
(Continued)

(56) References Cited

U.S. PATENT DOCUMENTS 8,913,859 B1 * 12/2014 Duncan .................. G02B 27/50
356/477
10,012,827 B1 * 7/2018 Duncan .................. G02B 23/00
(Continued)

FOREIGN PATENT DOCUMENTS

| CN | 104359553 A | 2/2015 |
| CN | 106989821 A | 7/2017 |
| CN | 107748397 A | 3/2018 |

OTHER PUBLICATIONS

Qinghua Yu et al., "System design for a 'checkboard' imager," Applied Optics, vol. 57, No. 35, section 2, and Figures 1-3 (Dec. 31, 2018).

*Primary Examiner* — Ryan A Lepisto
*Assistant Examiner* — Erin D Chiem
(74) *Attorney, Agent, or Firm* — Mei & Mark LLP; Manni Li

(57) ABSTRACT

A checkerboard imager comprises an aperture pair array in a rectangular shape, a 2D optical waveguide grating array, a 3D optical waveguide beam transmission array, a 2D optical waveguide quadrature modulation coupler array, and a photoelectric conversion data acquisition and image processing module. An object light is converged by sub-apertures of the aperture pair array, collected by the 2D optical waveguide grating array, and split into narrow-spectrum beams which are output to the 3D optical waveguide beam transmission array for cross-pairing, modulated and coupled by the 2D optical waveguide quadrature modulation coupler array, and reach the photoelectric conversion data acquisition and image processing module to obtain an object image. A method for implementing the checkerboard imager is provided where each module is independently manufactured and then integrated to improve yield of the modules and imager's optical efficiency, expand equivalent apertures, and improve working capability.

10 Claims, 6 Drawing Sheets

(58) Field of Classification Search
CPC ...... G02B 6/06; G02B 6/124; G02B 27/0012; G02B 27/1013; G02B 5/005; G02B 23/00; H04N 23/55
See application file for complete search history.

(56) References Cited

U.S. PATENT DOCUMENTS

| | | | |
|---|---|---|---|
| 10,302,409 B1 * | 5/2019 | Duncan | G01B 9/02038 |
| 10,564,373 B1 * | 2/2020 | Ogden | G02B 6/425 |
| 10,627,485 B2 * | 4/2020 | Swanson | G01S 7/4817 |
| 10,663,382 B2 * | 5/2020 | Iwasaki | G01N 3/36 |
| 11,099,297 B1 * | 8/2021 | Hurlburt | G01W 1/10 |
| 2019/0179082 A1 | 6/2019 | Grehn et al. | |
| 2020/0340861 A1 | 10/2020 | Meng et al. | |

* cited by examiner

CHECKERBOARD IMAGER AND IMPLEMENTATION METHOD THEREFOR

CROSS-REFERENCE TO RELATED APPLICATIONS

The subject application is a continuation of PCT/CN2020/115763 filed on Sep. 17, 2020, which in turn claims priority on Chinese Patent Application No. 202010965700. X filed on Sep. 15, 2020 in China. The contents and subject matters of the PCT international stage application and Chinese priority application are incorporated herein by reference.

TECHNICAL FIELD

The present invention relates to photoelectric imaging, in particular, a checkerboard imager and the implementation method therefor.

BACKGROUND ART

In view of the limitations of traditional telescopes having large sizes, heavy mass, and difficulty in assembly and transportation, Lockheed Martin Space Systems Company disclosed the SPIDER (Segmented Planar Imaging Detector for Electro-optical Reconnaissance) in 2012, which is based on the principle of interferometric imaging, and unlike the large and bulky lenses used in traditional telescopes, uses thousands of lens arrays to collect light and integrates the lens arrays and waveguide arrays on substrates with a photonic integration technology, that is, thousands of interferometric telescope arrays are miniaturized on a single chip. The detector integrates the optics, processing system, and readout circuit on a single chip, so its size, mass, and power consumption are ten times or even one hundred times smaller than those of traditional telescopes. The SPIDER imaging system uses a gear-shaped configuration structure, which has the problems of incomplete space frequency domain sampling and poor image quality. In 2017, Shanghai Institute of Technical Physics, Chinese Academy of Sciences, disclosed a compact rectangular aperture configuration structure and a sampling method for a target space frequency in Chinese Patent Application No. 201711000143.2, which solves the problem of incomplete space frequency sampling of the SPIDER. The technology is also published in an article titled "System design for a 'checkerboard' imager," Applied Optics, Vol. 57, No. 35, which discloses using a 3D optical waveguide for the aperture symmetry pairing for beam propagation, however, it does not provide a spectral spectroscopic solution, does not solve the problem of beam cross loss, and does not give the technical solution that can be implemented for developing 3D optical waveguide.

SUMMARY OF INVENTION

The present invention provides a checkerboard imager and an implementation method therefor, which solves the problems in the current technology, such as the spectral spectroscopic solution and beam cross loss, provides a 3D optical waveguide and a feasible implementation method for the checkerboard imager, and plays an important role in the fields of scientific exploration, national defense, space exploration, etc.

The checkerboard imager of the present invention comprises an aperture pair array provided in a rectangular shape, a 2D optical waveguide grating array, a 3D optical waveguide beam transmission array, a 2D optical waveguide quadrature modulation coupler array, and a photoelectric conversion data acquisition and image processing module; the aperture pair array is located at the forefront, an object light is converged by sub-apertures, then collected by the 2D optical waveguide grating array at the rear, and then split into narrow-spectrum beams; and the narrow-spectrum beams are output to the 3D optical waveguide beam transmission array to complete cross-pairing transmission of the narrow-spectrum beams, then, multiple paths of narrow-spectrum beams having different frequencies are modulated and coupled by the 2D optical waveguide quadrature modulation coupler array, respectively, and reach the photoelectric conversion data acquisition and image processing module where an object image is finally obtained by a data processing and image inversion reconstruction algorithm.

Further, the aperture pair array in the rectangular shape is a one-, two-, three-, or four-quadrant aperture pair array in accordance with a compact rectangular aperture configuration structure and as described in the sampling method for target space frequency; the 3D optical waveguide beam transmission array corresponds to the one-, two-, three-, or four-quadrant aperture pair array and accomplishes the cross-pairing transmission of the narrow-spectrum beams according to the compact rectangular aperture configuration structure and the sampling method for the target space frequency; and each quadrant of the 3D optical waveguide beam transmission array is formed by nesting concentric-square-shaped transmission optical waveguide chips having different internal and external dimensions.

Further, each concentric-square-shaped transmission optical waveguide chip is molded by fiber bundles or comprises four 3D transmission waveguide chips with limited thicknesses and four 90-degree deflecting mirrors.

Further, the 2D optical waveguide grating array comprises a plurality of 2D optical waveguide grating chips, and each 2D optical waveguide grating chip comprises one or more layers of 2D optical waveguide gratings having the same function.

Further, the 2D optical waveguide quadrature modulation coupler array comprises a plurality of 2D quadrature modulation coupler chips, and each 2D quadrature modulation coupler chip comprises one or more layers of 2D quadrature modulation coupler arrays; and working spectra of the 2D quadrature modulation coupler arrays cover the spectra of the input optical waves which are subjected to dispersive spectrometry by the 2D optical waveguide grating array and cross-pairing by the 3D optical waveguide beam transmission array, different working spectra correspond to different 2D quadrature modulation coupler arrays, respectively, and the 2D quadrature modulation coupler arrays suitable for the different working spectra are located on the same layer or different layers of the 2D quadrature modulation coupler chips.

Further, an optical path compensation light path for the narrow-spectrum beams is provided at an input end of the 2D optical waveguide quadrature modulation coupler array.

The present invention further provides an implementation method for the checkerboard imager, comprising:
 S101, separately manufacturing the aperture pair array, the 2D optical waveguide grating array, the 3D optical waveguide beam transmission array, the 2D optical waveguide quadrature modulation coupler array, and the photoelectric conversion data acquisition and image processing module in the group component array;
 S102, completing coupling among the aperture pair array, the 2D optical waveguide grating array, the 3D optical waveguide beam transmission array, and the 2D optical waveguide quadrature modulation coupler array to form an optical waveguide working unit; and S103, coupling the optical waveguide working unit with the photoelectric conversion data acquisition and image processing module to form the checkerboard imager.

Further, in S101, the 2D optical waveguide grating array and the 2D optical waveguide quadrature modulation coupler array are manufactured by a 2D optical waveguide manufacturing process; the 3D optical waveguide beam transmission array is manufactured by a 3D optical waveguide manufacturing process; and the concentric-square-shaped transmission optical waveguide chips in the 3D optical waveguide beam transmission array are each molded by fiber bundles or comprise four 3D transmission waveguide chips having limited thicknesses and four 90-degree deflecting mirrors.

Further, in S102, the coupling step is completed by an alignment gluing process to form the optical waveguide working unit.

Further, in S103, the coupling step is completed by the alignment gluing process to form the checkerboard imager.

The present invention provides the following advantages:

1. The present invention introduces the 3D optical waveguide beam transmission array for beam transmission, which avoids cross loss of 2D optical waveguide common substrate beam transmission and improves optical efficiency and modular development yield of the checkerboard imager.

2. The present invention puts a dispersive spectroscopic function device in front of the 3D optical waveguide beam transmission array, dispersive spectrometry is performed first, and then paired transmission of narrow-spectrum beams is completed with the help of the 3D optical waveguide beam transmission array, so as to ensure abilities of the imager of interference, detection, and acquisition of object light, also completely avoid the problem of physical intersection of optical paths in a 2D optical waveguide, and improve optical efficiency of the optical paths of the imager.

3. The fiber bundle molding solution of the present invention performs an implementation method for a 3D optical wave transmission chip, with reference to the 2D optical waveguide grating array and the 2D optical waveguide quadrature modulation coupler array, optical transmission efficiency of the checkerboard imager is higher, and equivalent apertures may be expanded to a meter level, or even larger scale, which greatly improves a working ability of the checkerboard imager.

4. The present invention introduces the method of independently manufacturing the modules and then integrating the modules, which is conducive to development of each module, and greatly improves a yield of the modules and a development yield of the imager by controlling interface between the modules.

Figure 1:
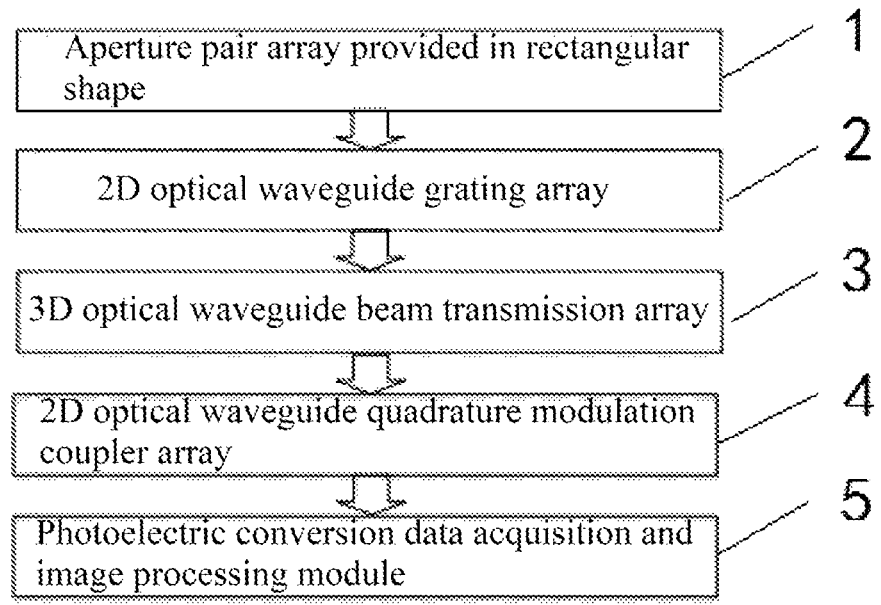
FIG. 1 shows the structure of the checkerboard imager in a preferred embodiment of the present invention.

Reference numbers used in the figures refer to the following structures: 1—aperture pair array; 2—2D optical waveguide grating array; 3—3D optical waveguide beam transmission array; 4—2D optical waveguide quadrature modulation coupler array; 5—photoelectric conversion data acquisition and image processing module; 201—2D optical waveguide grating chip; 202—optical waveguide grating device; 301—90-degree deflecting mirror; 302—3D transmission waveguide chip; 303—concentric-square-shaped 3D optical wave transmission chip; 304—fiber bundle; 401—2D quadrature modulation coupler chip.

DETAILED DESCRIPTION OF THE EMBODIMENTS

The present invention is further described with reference to particular embodiments. These examples are merely illustrative of the present invention and are not intended to limit the scope of the present invention. Further, it should be understood that after reading the contents described in the present invention, those skilled in the art can make various changes or modifications to the present invention, and these equivalent forms also fall within the scope defined by the appended claims of the present application.

Chinese Patent Application No. CN201711000143.2, "A compact rectangular aperture configuration structure and a sampling method for a target space frequency," which is incorporated herein by reference, uses a compact rectangular aperture arrangement and divides a rectangular aperture into 4 quadrants, and the apertures in the quadrants are symmetrically paired relative to the center to realize continuous integer coverage sampling of space frequencies in a certain space frequency range, and acquire a target image by the inverse Fourier transform. The aperture arrangement may realize full acquisition in the certain continuous space frequency range, acquire continuous and non-redundant space frequency coverage, and improve imaging quality of a target.

In the present invention, the size and scale of the aperture pair array provided in the rectangular shape are related to imaging quality requirements and designed according to the requirements of the imaging quality in accordance with those in CN201711000143.2. The aperture pair array provided in the rectangular shape in the present invention is divided into four quadrants, and the aperture pairs in each quadrant are provided in a concentric-square shape, and the aperture pairs are symmetrically paired about a geometric center of the concentric-square shape in the concentric-square shapes where the aperture pairs are located. The aperture pair array in the quadrants play a role in aggregating space frequency domain information of object light in an imager. If the aperture pair array used in the imager includes the four quadrants described in CN201711000143.2, a four-quadrant checkerboard imager is formed. In addition, according to image clarity, instrument volume and weight, and other needs, the imager may use only one, two, or three of the four quadrants described in the sampling method, and by combining with the image processing algorithm, the imaging quality is improved, and thus, the checkerboard imager may also be one, two, or three of the four-quadrant array of the four-quadrant checkerboard imager. The checkerboard imager in each quadrant comprises an aperture pair array which is provided in a rectangular shape, a 2D optical waveguide grating array, a 3D optical waveguide beam transmission array, a 2D optical waveguide quadrature modulation coupler array, a photoelectric conversion data acquisition and image processing module.

To ensure the interference detection and acquisition ability of the checkerboard imager on the beam information of the object light, it is necessary to convert the wide-spectrum object light in the narrow-spectrum object light via dispersive spectrometry prior to performing the quadrature modulation interference. According to the functional role, the dispersive spectrometry module must be placed before the optical path of the quadrature modulation coupler. However, if the layout of SPIDER (see U.S. Pat. No. 8,913,859B1) is followed, the dispersive spectrometry module and the quadrature modulation coupler module are closely linked based on the same base plate; in the configuration, even if a 3D optical waveguide is used for transmitting wide-spectrum beams in a paired manner, a physical cross-loss problem between multi-spectrum optical paths still exists in the 2D optical waveguide. In the present invention, in contrast, the device that carries the function of the dispersive spectrometry is placed in front of the 3D optical waveguide beam transmission array and the dispersive spectrometry is performed first, and then paired transmission of narrow-spectrum beams is completed as aided by the 3D optical waveguide beam transmission array, which completely avoids the problem of physical cross of optical paths in the 2D optical waveguide and improves optical efficiency of the optical paths of the imager. Beams of different narrow-spectrums input by the 3D optical waveguide beam transmission array are output in paired according to CN201711000143.2.

According to the feature that the beams of different narrow-spectrums input by the 3D optical waveguide beam transmission array are output in pairs as disclosed in CN201711000143.2, the 3D optical waveguide beam transmission array is a four-quadrant array, or one, two, or three of the four-quadrant arrays in the present invention. Each quadrant array is formed by nesting concentric-square-shaped transmission optical waveguide chips having different internal and external dimensions. A beam pairing transmission function of each concentric-square-shaped 3D optical wave transmission chip satisfies requirements in CN201711000143.2 and completes paired output of aperture pairs corresponding to the beams of each narrow working spectrum in the concentric-square-shaped aperture pair array.

According to one preferred embodiment of the checkerboard imager of the present invention, the working wavelength is 500 nm to 600 nm, which is divided into 10 working narrow spectra, and each wave band has a width of 10 nm, a rectangular aperture pair array has a size of 31×31, a maximum baseline has a length of 150 mm, a matrix aperture pair array has an aperture element diameter of 10 mm, and an F number is 10.

As shown in FIG. 1, the checkerboard imager of one preferred embodiment of the present invention comprises an aperture pair array 1 which is provided in a rectangular shape, a 2D optical waveguide grating array 2, 3D optical waveguide beam transmission arrays 3, a 2D optical waveguide quadrature modulation coupler array 4, and a photoelectric conversion data acquisition and image processing module 5. The aperture pair array 1 is located at forefront, where wide-spectrum object light is converged by sub-apertures, collected by the 2D optical waveguide grating array 2 at the rear, and then split into narrow-spectrum beams; the narrow-spectrum beams are output to the 3D optical waveguide beam transmission arrays 3 for cross-paired output, and the multi-path multi-frequency narrow-spectrum beams are coupled by the 2D optical waveguide quadrature modulation coupler array 4, and reach the photoelectric conversion data acquisition and image processing module 5, such that an object image is finally obtained by a data processing and image inversion reconstruction algorithm.

Figure 2:
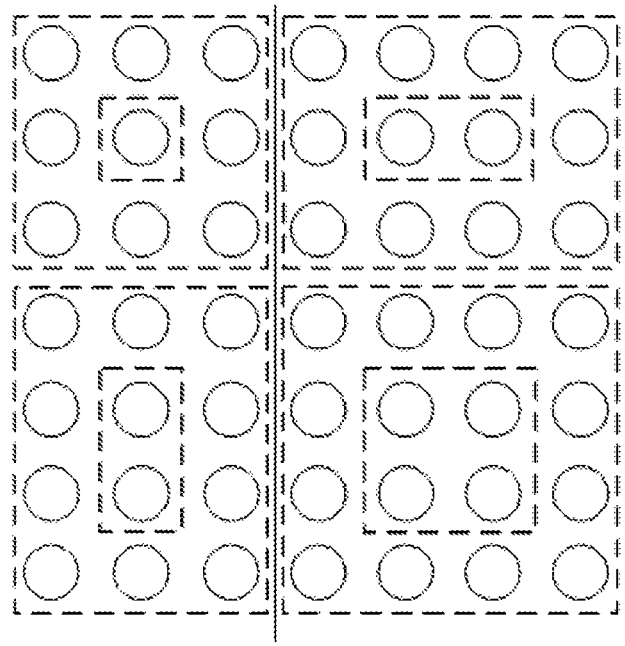
FIG. 2 shows the concentric-square-shaped region in the aperture pair array of the checkerboard imager in one preferred embodiment of the present invention.
Figure 3:
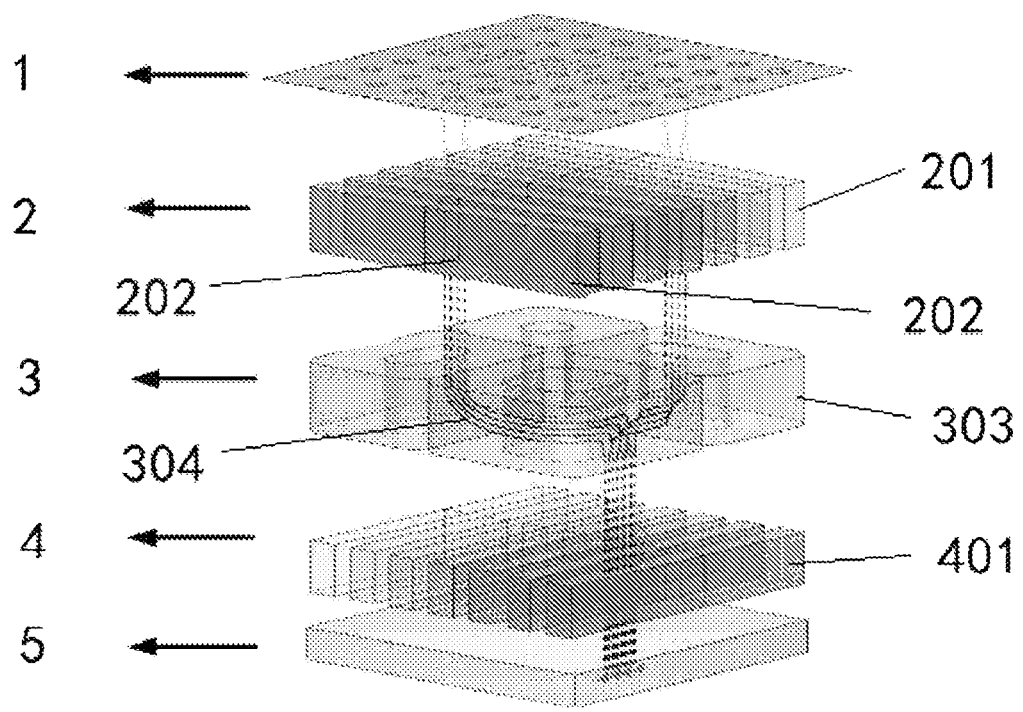
FIG. 3 shows the structure of the checkerboard imager with four quadrants in one preferred embodiment of the present invention.
Figure 4:
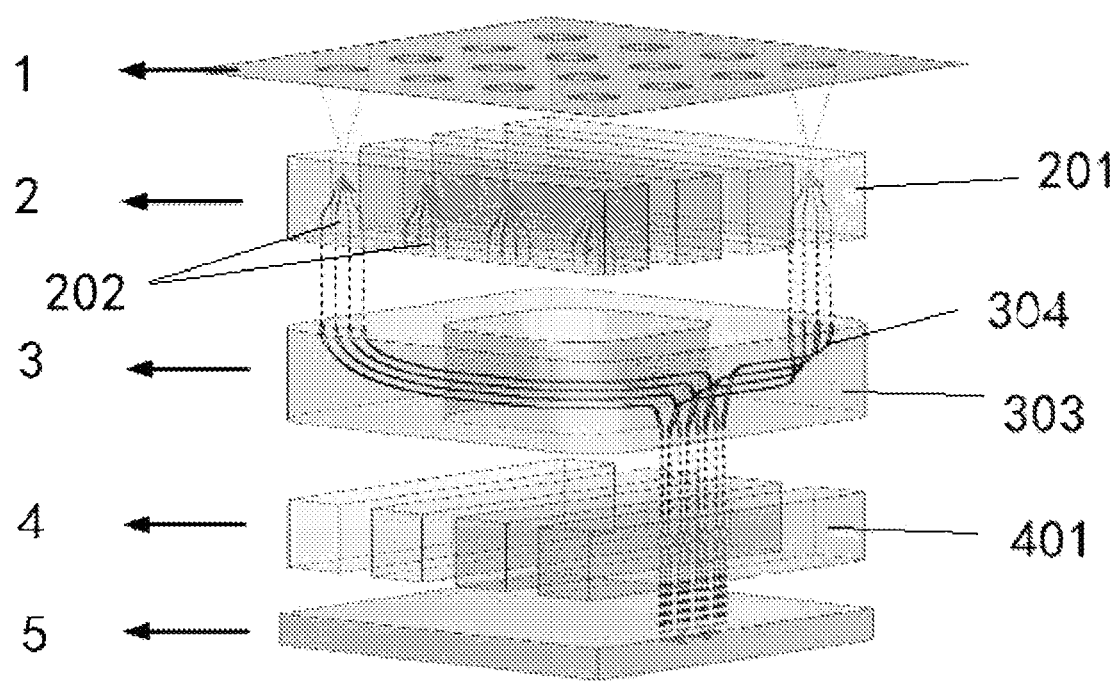
FIG. 4 shows the structure of the checkerboard imager with one of the four quadrants in one preferred embodiment of the present invention.

As shown in FIGS. 2 to 4, a four-quadrant design and thus a four-quadrant checkerboard imager is used in the embodiment. After being collected by the aperture pair array 1, the object light is collected by a corresponding optical waveguide behind the aperture pair array. Each aperture corresponds to an optical waveguide light receiving input end, that is, the light receiving 2D optical waveguide grating array 2 comprises 31 pieces of 2D optical waveguide grating chips 201, each having a length of 150 mm and a thickness of 2 mm, and each 2D optical waveguide grating chip 201 is made by a 2D lithography chip technology, and contains 31 pieces of optical waveguide grating devices 202, and spacing between input ends of the optical waveguide grating devices 202 is 10 mm. Each optical waveguide grating device 202 realizes ten channels of spectrometry as a group of outputs, each group of outputs has a center distance of 10 mm, and the spacing between output ends of 10 narrow wave bands in the group is 250 µm.

Four groups of concentric-square-shaped 3D optical waveguide beam transmission arrays 3 are in butt joint with the 2D optical waveguide grating array 2 (a rectangular aperture pair array having a scale of 7×7 is taken as an example to describe a concentric-square-shaped division mode in FIG. 2): scales of the four groups of array in the present example separately correspond to scales of the aperture pair array of 15×15, 16×15, 15 ×16, and 16×16 sizes (corresponding to scale of 3×3, 4×3, 3×4 and 4×4 in FIG. 3). Each concentric-square-shaped 3D optical waveguide beam transmission array 3 comprises a concentric-square-shaped 3D optical wave transmission chip 303, and a fiber bundle 304 is fixed by fiber bundle molding. Firstly, according to a direction (parallel to the 2D optical waveguide grating chips 201) of outputs of 10 paths of arrays in each group at an optical waveguide output end of the 2D optical waveguide grating array 2, and center spacing of each group of 10 mm, a configuration manner of an input end of a fiber bundle 304 of the 3D optical waveguide beam transmission array 3 is determined; and then, according to CN 201711000143.2, paired output of aperture pairs corresponding to beams of each narrow working spectrum in the concentric-square-shaped aperture pair array is completed.

In the process of paired output, consistency of the paired aperture to a transmission optical path length of the beams is kept as far as possible, the narrow-spectrum beams of different aperture pairs are output in pairs, the output ends still are output in groups, and each pair of aperture pairs are output in a group. Spacing between optical waveguide output ends in each group is 250 μm, output ends of different narrow bands are sequentially provided in pairs in one plane, the center distance of each group of transmission ends in one plane is 10 mm, and the center distance of any two adjacent planes in different planes is 10 mm and in parallel.

The 2D optical waveguide grating array 2 in the four-quadrant checkerboard imager in the preferred embodiment of the present invention comprises a series of 2D optical waveguide grating chips 201. Each 2D optical waveguide grating chip 201 comprises one or more layers of 2D optical waveguide gratings, and each optical waveguide grating unit has the same function.

The four-quadrant checkerboard imager of the preferred embodiment of the present invention respectively corresponds to the four groups of the 3D optical waveguide beam transmission arrays 3 composed of the concentric-square-shaped 3D optical waveguide transmission chips 303, and the sizes of the four groups of 3D optical waveguide beam transmission arrays respectively correspond to the four groups of the aperture pair arrays 1 having the scale of 15×15, 16×15, 15×16 and 16×16, among which, the output end array of the concentric-square-shaped 3D optical waveguide beam transmission array 3 corresponding to the aperture pair array 1 having a scale of 15×15 comprises eight planar arrays having a spacing of 10 mm. Except for an eighth plane (corresponding to a concentric-square-shaped center area), there are fifteen groups of 10 pairs of optical waveguide arrays in each plane (each pair of optical waveguide arrays corresponding to narrow-spectrum beams of one working narrow spectrum, and the narrow-spectrum beams including narrow-spectrum beams of the apertures from two different positions). The center distance of any adjacent optical waveguide array group is 10 mm, and the spacing between 10 pairs of optical waveguides in each group is 250 μm. In the eighth plane, 7 groups of 10 pairs of optical waveguide arrays (each pair of optical waveguide array corresponding to narrow-spectrum beams of one working narrow spectrum, and the narrow-spectrum beams including narrow-spectrum beams of the apertures from two different positions), and 1 group of 10 optical waveguide arrays (after collecting the central aperture beams of aperture pair array 1 corresponding to a scale of 15×15, the narrow-waveband beams being output after grating dispersive spectrometry, and the narrow-waveband beams being the narrow-spectrum beams only from one aperture position) exist. The center distance of any adjacent optical waveguide array group is 10 mm, and the spacing between the 10 pairs of or 10 pieces of optical waveguides in each group is 250 μm.

In the imager, the output end array of the concentric-square-shaped 3D optical waveguide beam transmission array 3 corresponding to the aperture pair array 1 having a scale of 16×15 comprises eight planar arrays having a spacing of 10 mm, 15 groups of 10 pairs of optical waveguide arrays exist in one plane, the center distance between any adjacent optical waveguide array groups is 10 mm, and the spacing between 10 pairs of optical waveguides in each group is 250 μm.

In the imager, the output end array of the concentric-square-shaped 3D optical waveguide beam transmission array 3 corresponding to the aperture pair array 1 having a scale of 15×16 comprises eight planar arrays having a spacing of 10 mm, 15 groups of 10 pairs of optical waveguide arrays exist in one plane, the center distance between any adjacent optical waveguide array groups is 10 mm, and the spacing between 10 pairs of optical waveguides in each group is 250 μm. The configuration direction for outputting each narrow-waveband optical waveguide array is orthogonal to that for inputting each narrow-waveband optical waveguide array.

In the imager, the output end array of the concentric-square-shaped 3D optical waveguide beam transmission array 3 corresponding to the aperture pair array 1 having a scale of 16×16 comprises eight planar arrays having a spacing of 10 mm, 16 groups of 10 pairs of optical waveguide arrays exist in one plane, the center distance between any adjacent optical waveguide array groups is 10 mm, and the spacing between 10 pairs of optical waveguides in each group is 250 μm.

The four groups of concentric-square-shaped 3D optical waveguide beam transmission arrays 3 are followed by the 2D optical waveguide quadrature modulation coupler arrays 4, and the scale, specification, optical waveguide array direction, and narrow-band working waveband of the 2D optical waveguide quadrature modulation coupler arrays correspond to those of the concentric-square-shaped 3D optical waveguide beam transmission arrays 3. Each 2D optical waveguide quadrature modulation coupler array 4 comprises a series of 2D quadrature modulation coupler chips 401. Each 2D quadrature modulation coupler chip 401 comprises one or more layers of 2D quadrature modulation coupler arrays, the 2D quadrature modulation coupler arrays cover all working spectrums of optical waveguide grating dispersive spectrometry, and different working spectrums correspond to different quadrature modulation couplers, and the 2D quadrature modulation couplers suitable for different working spectrums may be on the same layer or different layers of the optical waveguide.

The input ends of the 2D quadrature modulation coupler arrays 4 directly correspond to output ends of the 3D optical waveguide beam transmission arrays 3, that is, each 2D quadrature modulation coupler chip corresponds to an optical waveguide output end array plane of the output ends of four groups of concentric-square-shaped 3D optical waveguide beam transmission arrays 3. An aperture pair array having a scale of 15×15, an aperture pair array having a scale of 16×15, and an aperture pair array having a scale of 16×16 correspond to the arrays of the 2D optical waveguide grating chips 201 and are parallel to array directions of the 2D quadrature modulation coupler chips 401, and an aperture pair array having a scale of 15×16 corresponds to the arrays of the 2D optical waveguide grating chips 201 and are orthogonal to the array directions of 2D quadrature modulation coupler chips 401.

In the 2D quadrature modulation coupler chips 401, the output ends of the quadrature modulation couplers are output in a specific order, and the spacing between the output ends of optical waveguides is 125 μm. In addition, an optical path compensation light path is introduced into each narrow-band working channel splitting path at the input end of 2D optical waveguide quadrature modulation coupler array 4 to compensate an optical path difference introduced by the apertures of the 3D optical waveguide beam transmission array 3 to optical path pairing, so as to ensure that the introduced optical path difference inside the imager is zero or infinitely close to zero.

The output end of the 2D waveguide quadrature modulation coupler array 4 is directly connected to linear array detectors and readout circuits of the photoelectric conversion data acquisition and image processing module 5, and each 2D quadrature modulation coupler chip 401 corresponds to one linear array detector and one readout circuit.

To improve the optical efficiency of the system, in addition to the necessarily fixed support, butt joint bonding between the optical waveguide modules is used among the 2D optical waveguide grating chip array 2, the concentric-square-shaped 3D optical waveguide beam transmission array 3, and the 2D optical waveguide quadrature modulation coupler array 4 for improving the beam transmission efficiency of a beam transmission interface. Coupling efficiency between rectangular aperture pair light convergence and the 2D optical waveguide grating chip array 2 is about 80%, the beam transmission efficiency in the 2D optical waveguide grating chip array 2 is about 70%, bonding coupling efficiency between rectangular aperture pair light convergence and the 3D optical waveguide beam transmission array 3 is about 90%, transmission efficiency in the 3D optical waveguide beam transmission array 3 is about 99%, coupling efficiency between the 3D optical waveguide beam transmission array 3 and the 2D optical waveguide quadrature modulation coupler array 4 is about 90%, and coupling efficiency between the 2D waveguide quadrature modulation coupler array 4 and the photoelectric conversion data acquisition and image processing module 5 is about 80%, that is, optical efficiency of each channel of the imager is about 35.9%.

In the photoelectric conversion data acquisition and image processing module five, after multiple correlation intensity information of the space frequencies of the object light is obtained by the imager, the image information of the object light is obtained by an inverse Fourier transform algorithm.

As shown in FIGS. 5, 6, 7, and 8, due to limitation of the laser direct writing, when the 3D optical waveguide beam transmission array 3 is made of a block material having a large size, it is not conducive to direct writing by laser direct writing. Even if the "concentric-square-shaped" optical waveguides of the 3D optical waveguide beam transmission array are integral thin-walled bulk materials, the concentric-square-shaped walls are thin and have insufficient rigidity, it is not convenient for laser to directly write the four thin walls successively, and therefore, each "concentric-square-shaped" waveguide chip in the present invention has two implementation ways.

Figure 5:
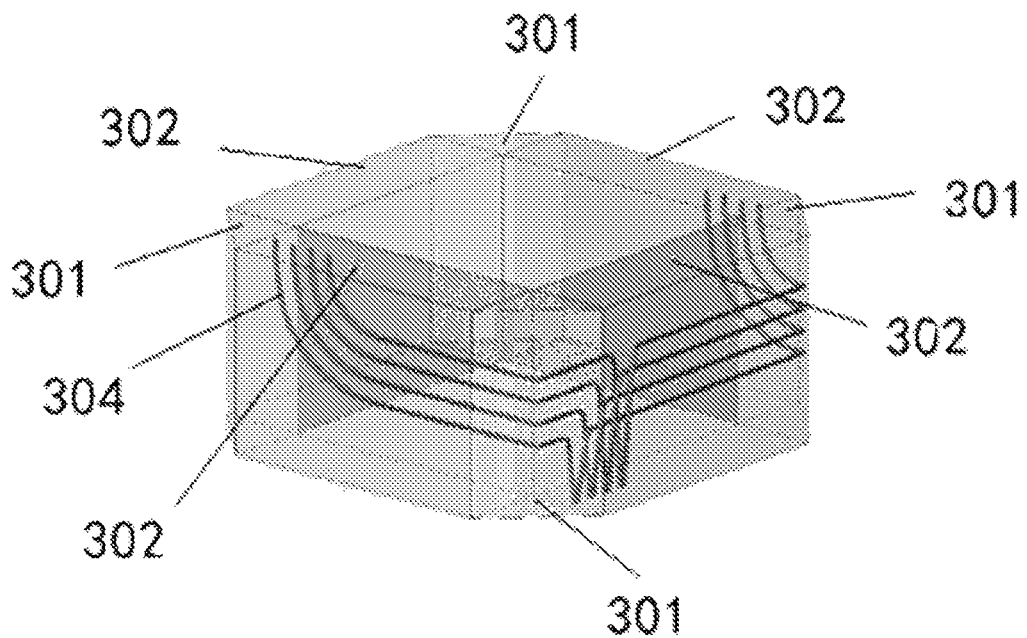
FIG. 5 is a side view showing the working principle of the spliced 3D optical waveguide beam transmission of the checkerboard imager in one preferred embodiment of the present invention.
Figure 6:
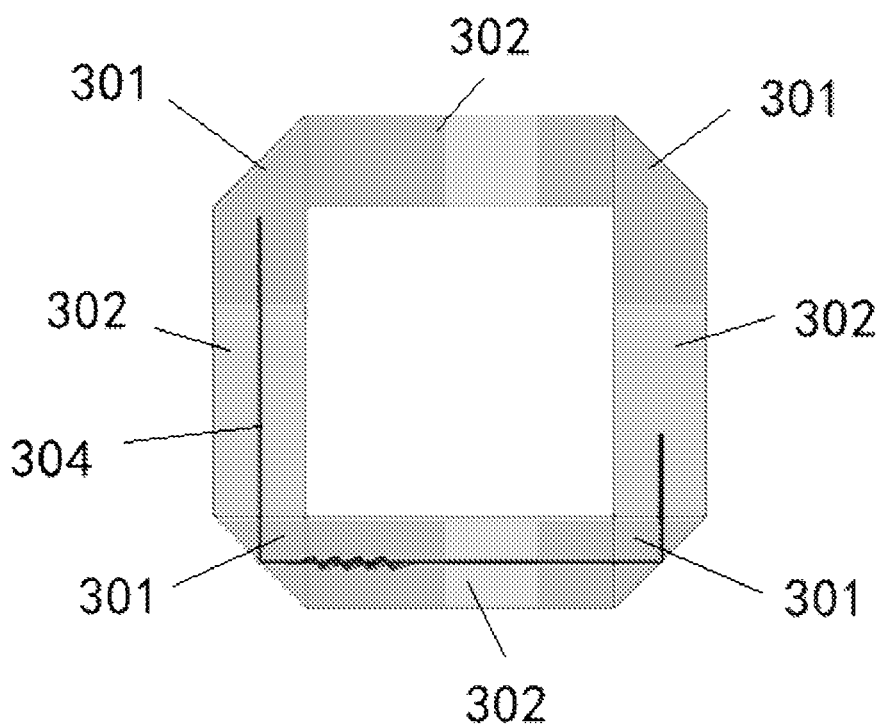
FIG. 6 is a top view showing the working principle of the spliced 3D optical waveguide beam transmission of the checkerboard imager of FIG. 5.

As shown in FIGS. 5 and 6, one implementation method is as follows: each concentric-square-shaped transmission optical waveguide chips comprises the four 3D transmission waveguide chips 302 having limited thicknesses and four 90-degree deflecting mirrors 301. The four 3D transmission waveguide chips having limited thicknesses may be made by molding fiber bundles, beams in the four 3D transmission waveguide chips 302 having limited thicknesses are transmitted along the fiber bundles 304, and the beams between the 3D transmission waveguide chips 302 are transmitted by refraction or reflection of the four 90-degree deflecting mirrors 301. The four 3D transmission waveguide chips having limited thicknesses may also be made by laser direct writing.

Figure 7:
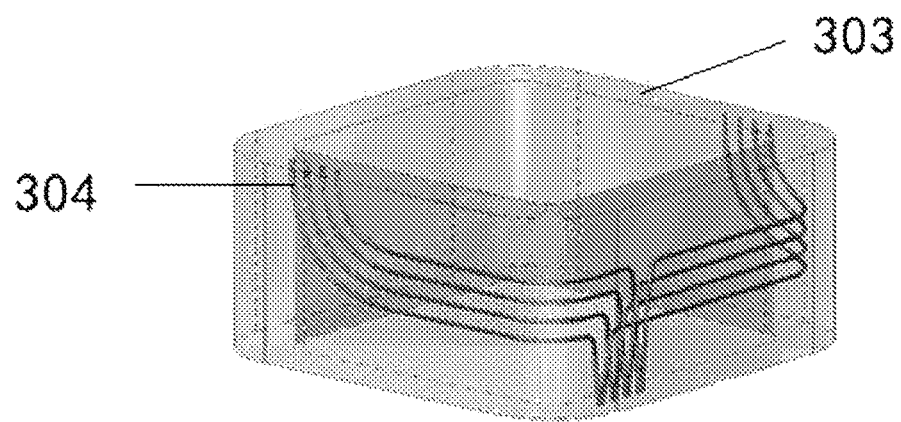
FIG. 7 is a side view showing the working principle of the optical fiber molded 3D optical waveguide beam transmission of the checkerboard imager in one preferred embodiment of the present invention.
Figure 8:
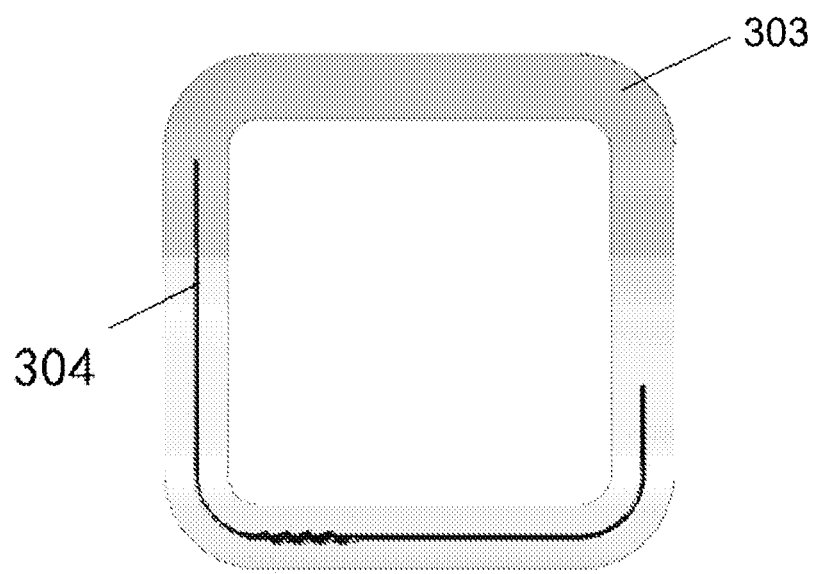
FIG. 8 is a top view showing the working principle of the optical fiber molded 3D optical waveguide beam transmission of the checkerboard imager of FIG. 7.

As shown in FIGS. 7 and 8, another implementation method is as follows: each "concentric-square-shaped" 3D optical waveguide transmission chip 303 is made by molding the optical fiber bundles, and in the "concentric-square-shaped" 3D optical waveguide transmission chip 303, beams are transmitted along the fiber bundles 304.

Whether laser direct writing or fiber bundle molding is used, attention should be paid to the turning radius to control the bending loss in the developing process. In addition, the refractive index change interfaces of core and cladding waveguides of laser direct-writing optical waveguides are uneven, scattering and absorption loss of a side wall is large (0.5 dB/cm) in a process of transmitting the beams in the 3D optical waveguide transmission chip, and therefore, a fiber bundle molding solution is conductive to reduction of the scattering and absorption loss of the side wall (0.36 dB/km) and improvement of the optical efficiency of the imager. The molding solution here mainly plays a role in fixing the fiber bundles 304, preventing the fiber bundles 304 from being shaken by external forces, resulting in change of a refractive index of the fiber bundles, and further affecting a transmission optical path of the beams.

Figure 9:
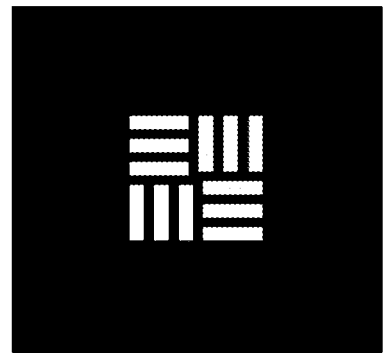
FIG. 9 shows the original input image of the checkerboard imager in one preferred embodiment of the present invention.
Figure 10:
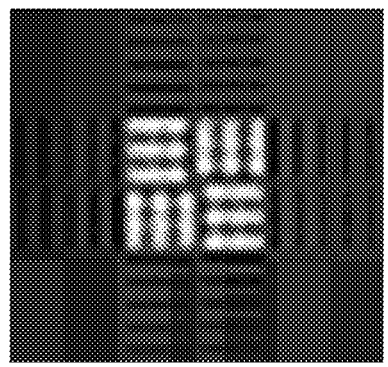
FIG. 10 shows the post-processing simulated effect image of the checkerboard imager in one preferred embodiment of the present invention.

As shown in FIGS. 9 and 10, an original image of FIG. 9 is input into the four-quadrant checkerboard imager having an aperture pair array having a scale of 31×31 of the present example, and an imaging simulation effect of the checkerboard imager is shown in FIG. 10.

Figure 11:
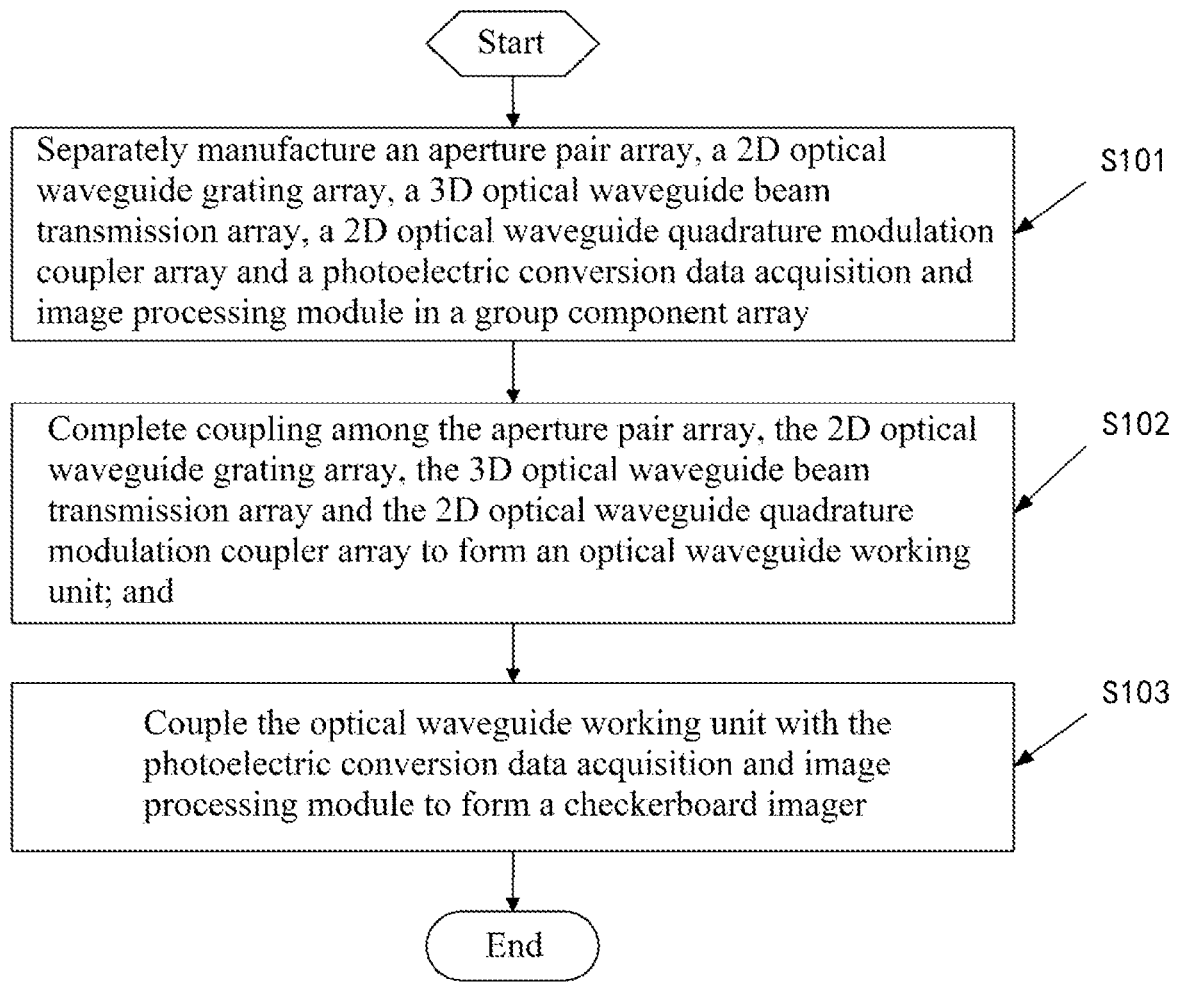
FIG. 11 is a flowchart showing the implementation method for the checkerboard imager in one preferred embodiment of the present invention.

As shown in FIG. 11, the implementation method for the checkerboard imager in the embodiment of the present invention comprises the following steps.

S101, separately manufacture the aperture pair array, the 2D optical waveguide grating array, the 3D optical waveguide beam transmission array, the 2D optical waveguide quadrature modulation coupler array, and the photoelectric conversion data acquisition and image processing module in the group component array.

In S101, the 2D optical waveguide grating array and the 2D optical waveguide quadrature modulation coupler array are manufactured by a 2D optical waveguide manufacturing process, and the 3D optical waveguide beam transmission array is manufactured by a 3D optical waveguide manufacturing process. The concentric-square-shaped transmission optical waveguide chips in the 3D optical waveguide beam transmission array are molded by fiber bundles, and may also be composed of four 3D transmission waveguide chips having limited thicknesses and four 90-degree deflecting mirrors.

S102, complete coupling among the aperture pair array, the 2D optical waveguide grating array, the 3D optical waveguide beam transmission array, and the 2D optical waveguide quadrature modulation coupler array by an alignment gluing process to form an optical waveguide working unit.

S103, couple the optical waveguide working unit with the photoelectric conversion data acquisition and image processing module by the alignment gluing process to form the checkerboard imager.

The above preferred embodiments of the present invention do not limit the scope of protection for the present invention, and any equivalent structure or process changes made by using the contents of the description and drawings of the present invention and are directly or indirectly applied in other related technical fields should fall within the scope of the present invention.

I claim:

1. A checkerboard imager, comprising
an aperture pair array in a rectangular shape with sub-apertures,
a 2D optical waveguide grating array,
a 3D optical waveguide beam transmission array,
a 2D optical waveguide quadrature modulation coupler array, and
a photoelectric conversion data acquisition and image processing module,
wherein the aperture pair array is located at forefront, an object light is converged by the sub-apertures, collected by the 2D optical waveguide grating array at rear, and split into narrow-spectrum beams, the narrow-spectrum beams are output to the 3D optical waveguide beam transmission array to accomplish cross-pairing transmission of the narrow-spectrum beams, multiple paths of the narrow-spectrum beams having different frequencies are modulated and coupled by the 2D optical waveguide quadrature modulation coupler array, respectively, and reach the photoelectric conversion data acquisition and image processing module, and an object image is obtained by a data processing and image inversion reconstruction algorithm in the photoelectric conversion data acquisition and image processing module.

2. The checkerboard imager according to claim 1, wherein the aperture pair array in the rectangular shape is a one-, two-, three-, or four-quadrant aperture pair array in a compact rectangular aperture configuration in accordance with a sampling method for a target space frequency, the 3D optical waveguide beam transmission array corresponds to the one-, two-, three-, or four-quadrant aperture pair array and completes the cross-pairing transmission of the narrow-spectrum beams according to the compact rectangular aperture configuration and the sampling method for the target space frequency; and each quadrant of the 3D optical waveguide beam transmission array is formed by nesting concentric-square-shaped transmission optical waveguide chips having different internal and external dimensions.

3. The checkerboard imager according to claim 2, wherein each concentric-square-shaped transmission optical waveguide chip is molded by fiber bundles, or comprises four 3D transmission waveguide chips of limited thicknesses and four 90-degree deflecting mirrors.

4. The checkerboard imager according to claim 1, wherein the 2D optical waveguide grating array comprises a plurality of 2D optical waveguide grating chips, and each 2D optical waveguide grating chip comprises one or more layers of 2D optical waveguide gratings of same function.

5. The checkerboard imager according to claim 1, wherein the 2D optical waveguide quadrature modulation coupler array comprises a plurality of 2D quadrature modulation coupler chips, and each 2D quadrature modulation coupler chip comprises one or more layers of 2D quadrature modulation coupler arrays;

working spectra of the 2D quadrature modulation coupler arrays cover spectra of input optical waves subjected to dispersive spectrometry by the 2D optical waveguide grating array and cross-pairing by the 3D optical waveguide beam transmission array, different working spectra correspond to different 2D quadrature modulation coupler arrays, and the 2D quadrature modulation coupler arrays suitable for different working spectra are located on a same layer or different layers of the 2D quadrature modulation coupler chips.

6. The checkerboard imager according to claim 5, wherein an optical path compensation light path for the narrow-spectrum beams is provided at an input end of the 2D optical waveguide quadrature modulation coupler array.

7. A method for implementing the checkerboard imager according to claim 1, comprising:

S101, respectively preparing the aperture pair array, the 2D optical waveguide grating array, the 3D optical waveguide beam transmission array, the 2D optical waveguide quadrature modulation coupler array, and the photoelectric conversion data acquisition and image processing module;

S102, coupling the aperture pair array, the 2D optical waveguide grating array, the 3D optical waveguide beam transmission array, and the 2D optical waveguide quadrature modulation coupler array to form an optical waveguide working unit; and S103, coupling the optical waveguide working unit with the photoelectric conversion data acquisition and image processing module to form the checkerboard imager.

8. The method according to claim 7, wherein in step S101, the 2D optical waveguide grating array and the 2D optical waveguide quadrature modulation coupler array are prepared by a 2D optical waveguide manufacturing process, and the 3D optical waveguide beam transmission array is prepared by a 3D optical waveguide manufacturing process; and concentric-square-shaped transmission optical waveguide chips in the 3D optical waveguide beam transmission array each are molded by fiber bundles, or comprises four 3D transmission waveguide chips of limited thicknesses and four 90-degree deflecting mirrors.

9. The method according to claim 7, wherein in step S102, coupling is completed by an alignment gluing process to form the optical waveguide working unit.

10. The method according to claim 7, wherein in step S103, coupling is completed by an alignment gluing process to form the checkerboard imager.

* * * * *